United States Patent
Ahn

(10) Patent No.: US 11,867,495 B2
(45) Date of Patent: Jan. 9, 2024

(54) ELECTRONIC DEVICE FOR PROVIDING IMAGE DATA USING AUGMENTED REALITY AND CONTROL METHOD FOR SAME

(71) Applicant: SAMSUNG ELECTRONICS CO., LTD., Suwon-si (KR)

(72) Inventor: Youngchun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 17/285,256

(22) PCT Filed: Jul. 2, 2019

(86) PCT No.: PCT/KR2019/008021
§ 371 (c)(1),
(2) Date: Apr. 14, 2021

(87) PCT Pub. No.: WO2020/091182
PCT Pub. Date: May 7, 2020

(65) Prior Publication Data
US 2021/0372772 A1    Dec. 2, 2021

(30) Foreign Application Priority Data

Oct. 30, 2018  (KR) .................. 10-2018-0131104

(51) Int. Cl.
 *G01B 11/02* (2006.01)
 *G06T 7/62* (2017.01)
 *G01B 11/03* (2006.01)

(52) U.S. Cl.
CPC .......... *G01B 11/026* (2013.01); *G01B 11/022* (2013.01); *G01B 11/03* (2013.01); *G06T 7/62* (2017.01); *G06T 2207/10024* (2013.01)

(58) Field of Classification Search
CPC ..... G01B 11/026; G01B 11/022; G01B 11/03; H04M 1/725; G06T 7/13; G06T 7/62; G06T 19/00; G06T 2207/10024
See application file for complete search history.

(56) References Cited

U.S. PATENT DOCUMENTS 8,437,567 B2    5/2013  Jeong et al.
8,666,158 B2    3/2014  Strassenburg-Kleciak
(Continued)

FOREIGN PATENT DOCUMENTS

| CN | 104101872 | 12/2017 |
|---|---|---|
| JP | 2005-128877 | 5/2005 |
| JP | 5538411 | 7/2014 |
| KR | 10-2011-0046904 | 5/2011 |
| KR | 10-2012-0100737 | 9/2012 |

(Continued)

OTHER PUBLICATIONS

Office Action dated Jan. 12, 2023 in Korean Application No. 10-2018-0131104 and English-language machine translation.
(Continued)

*Primary Examiner* — Sang H Nguyen
(74) *Attorney, Agent, or Firm* — Nixon & Vanderhye, P.C.

(57) ABSTRACT

The present disclosure provides an electronic device and a control method for same. The electronic device of the present disclosure includes a sensor, a display, a camera, and a processor. The processor determines a boundary area between a wall surface and an area other than the wall surface area from an image frame acquired by the camera, determines the distance between the electronic device and a wall surface corresponding to the wall surface area on the basis of the position of the electronic device and the determined boundary area, the position of the electronic device being determined by the sensor, and controls the display so that an object is displayed on the walls surface area in a size corresponding to the determined distance.

10 Claims, 9 Drawing Sheets

(56) References Cited

U.S. PATENT DOCUMENTS

| | | | |
|---|---|---|---|
| 9,280,824 B2 | 3/2016 | Fukuda | |
| 9,304,194 B2 | 4/2016 | Rhee et al. | |
| 9,377,298 B2 | 6/2016 | Zogg et al. | |
| 9,759,548 B2 | 9/2017 | Sumiyoshi et al. | |
| 10,410,421 B2 | 9/2019 | Kim | |
| 11,348,269 B1* | 5/2022 | Ebrahimi Afrouzi | G01S 17/89 |
| 2005/0195478 A1* | 9/2005 | Yanagawa | H04N 13/305 |
| | | | 359/462 |
| 2012/0249416 A1 | 10/2012 | Maciocci et al. | |
| 2016/0037151 A1* | 2/2016 | Lin | H04N 13/271 |
| | | | 348/46 |
| 2016/0314593 A1 | 10/2016 | Metzler et al. | |
| 2018/0099661 A1* | 4/2018 | Bae | B62D 15/0285 |
| 2018/0288316 A1* | 10/2018 | Shionoya | H04N 23/843 |
| 2018/0318704 A1* | 11/2018 | Ikenoue | G06T 7/70 |

FOREIGN PATENT DOCUMENTS

| | | |
|---|---|---|
| KR | 10-2014-0145217 | 12/2014 |
| KR | 10-1591579 | 2/2016 |
| KR | 10-1600820 | 3/2016 |
| KR | 10-1758058 | 7/2017 |
| KR | 10-2018-0036098 | 4/2018 |

OTHER PUBLICATIONS

International Search Report for PCT/KR2019/008021, with English translation, dated Oct. 22, 2019, 4 Pages.

Written Opinion of the ISA for PCT/KR2019/008021, with English translation, dated Oct. 22, 2019, 8 pages.

Office Action dated Jul. 31, 2023 in Korean Patent Application No. 10-2018-0131104 and English-language machine translation.

\* cited by examiner

ELECTRONIC DEVICE FOR PROVIDING IMAGE DATA USING AUGMENTED REALITY AND CONTROL METHOD FOR SAME

This application is the U.S. national phase of International Application No. PCT/KR2019/008021 filed 2 Jul. 2019, which designated the U.S. and claims priority to KR Patent Application No. 10-2018-0131104 filed 30 Oct. 2018, the entire contents of each of which are hereby incorporated by reference.

BACKGROUND

Field

This disclosure relates to an electronic device providing image data using augmented reality (AR) and a control method for the same. More particularly, this disclosure relates to an electronic device providing image data including AR information and a control method thereof.

Description of Related Art

Development of an electronic technology has led to development of various electronic devices. Recently, electronic devices to which augmented reality (AR) or mixed reality (MR) are applied are commercialized. Here, the augmented reality or mixed reality (hereinafter, referred to as an augmented reality (AR)) may synthesize a virtual object in a real environment to make the virtual object look as if the virtual object exists in the real world or may additionally provide information necessary for a real environment.

By using AR in daily life as well as industrial fields such as manufacturing business, marketing, or the like, a user may place a virtual object having a specific size, such as an object (or a product), on an image which is an image of a space in the real world captured by a user. As a distance to a space where the object is disposed increases, a size of the object, which is a thing, becomes smaller, so that a technology to detect a plane in which the object is disposed to accurately measure the distance to the plane may be required.

In the case of an image captured by using a dual lens, distance may be measured by obtaining three-dimensional (3D) information from an image obtained by simultaneously capturing one object at different angles by respective lenses. However, as for a single lens (or a mono lens, hereinafter referred to as a mono lens), there is a structural limitation that a mode of a dual lens may not be used in that there is one lens.

As for an image obtained by capturing a wall surface of a single color by a single lens, it is not possible to detect an accurate distance to the wall surface, as the wall surface of a single color without a texture or a pattern may not be detected as a vertical plane.

SUMMARY

The disclosure is to address the above-described problems, and an object of the disclosure is to provide an electronic device which is capable of detecting a wall surface area from an image frame and providing an image in which an object for AR is synthesized on the wall surface area in real time, and a control method thereof.

According to an embodiment, an electronic device includes a sensor, a display, a camera, and a processor configured to identify a boundary area between a wall surface area and an area other than the wall surface area from an image frame obtained by the camera, identify a distance between a wall surface corresponding to the wall surface area and the electronic device based on a position of the electronic device identified by the sensor and the identified boundary area, and control the display so that an object is displayed on the wall surface area in a size corresponding to the identified distance.

The processor may identify a similar pixel having a color similarity with a reference pixel present in a preset position by a threshold value or more, from a plurality of image frames obtained by the camera, respectively, and based on a difference of sizes of areas including the reference pixel and the similar pixel being within a preset threshold range among the plurality of image frames, identify the area including the reference pixel and the similar pixel as the wall surface area.

The processor may identify a pattern area including a specific pattern from an area other than the wall surface area, obtain a set of three-dimensional (3D) points from the pattern area based on a movement of the electronic device identified by the sensor, and identify the boundary area according to a straight line corresponding to the set of 3D points.

The processor may identify a degree of changing a position of the wall surface area from the plurality of image frames obtained by the camera while the electronic device moves, and identify a distance between a boundary corresponding to the boundary area and the electronic device based on the degree of changing the position of the wall surface area and a degree of movement of the electronic device identified by the sensor.

The area other than the wall surface area may include a ceiling area present in an upper side of the wall surface area and a floor area present in a lower side of the wall surface area from the image frame, and the processor may identify a first boundary area between the ceiling area and the wall surface area and a second boundary area between the floor area and the wall surface area from the image frame.

The processor may identify a distance between a wall surface corresponding to the wall surface area and the electronic device based on the distance between the electronic device and the boundary area and the height of the electronic device obtained by the sensor.

The processor may identify the height of the electronic device with respect to a floor surface by the sensor, and identify the distance between the wall surface and the electronic device based on a second boundary corresponding to the second boundary area and the height of the electronic device.

The processor may identify a size corresponding to the identified distance based on the preset size of the object and the preset distance, and control the display to display the object in the wall surface area in the identified size.

The processor may, based on receiving a user command to select a position among the wall surface area, control the display to display the object on the selected position.

According to an embodiment, a control method of an electronic device includes identifying a boundary area between a wall surface area and an area other than the wall surface area from an image frame obtained by the camera; identifying a distance between a wall surface corresponding to the wall surface area and the electronic device based on a position of the electronic device identified by the sensor and the identified boundary area; and displaying an object on the wall surface area in a size corresponding to the identified distance.

The identifying the boundary area may further include identifying a similar pixel having a color similarity with a reference pixel present in a preset position by a threshold value or more, from a plurality of image frames obtained by the camera, respectively, and based on a difference of sizes of areas including the reference pixel and the similar pixel being within a preset threshold range among the plurality of image frames, identifying the area including the reference pixel and the similar pixel as the wall surface area.

The identifying the boundary area may include identifying a pattern area including a specific pattern from an area other than the wall surface area, obtaining a set of three-dimensional (3D) points from the pattern area based on a movement of the electronic device identified by the sensor, and identifying the boundary area according to a straight line corresponding to the set of 3D points.

The identifying the distance between the wall surface and the electronic device may further include identifying a degree of changing a position of the wall surface area from the plurality of image frames obtained by the camera while the electronic device moves, and identifying a distance between a boundary corresponding to the boundary area and the electronic device based on the degree of changing the position of the wall surface area and a degree of movement of the electronic device identified by the sensor.

The area other than the wall surface area may include a ceiling area present in an upper side of the wall surface area and a floor area present in a lower side of the wall surface area from the image frame, and, the identifying the boundary area may include identifying a first boundary area between the ceiling area and the wall surface area and a second boundary area between the floor area and the wall surface area from the image frame.

The identifying the distance between the wall surface and the electronic device may include identifying a distance between a wall surface corresponding to the wall surface area and the electronic device based on the distance between the electronic device and the boundary area and the height of the electronic device obtained by the sensor.

The identifying the distance between the wall surface and the electronic device may include identifying the height of the electronic device with respect to a floor surface by the sensor, and identifying the distance between the wall surface and the electronic device based on a second boundary corresponding to the second boundary area and the height of the electronic device.

The displaying may include identifying a size corresponding to the identified distance based on the preset size of the object and the preset distance, and displaying the object in the wall surface area in the identified size.

The displaying may include, based on receiving a user command to select a position among the wall surface area, displaying the object on the selected position.

According to various embodiments as described above, an electronic device for providing an image in which an object for AR is synthesized on the wall surface area by detecting the wall surface area from an image and a control method thereof may be provided.

In addition, when the distance between the electronic device and the wall surface of the single color is measured by using the image frame captured by the mono lens, the accuracy of the distance measurement may be improved, and a product may be small-scaled and simplified compared to the case having the dual lens, and the production cost may be reduced.

DETAILED DESCRIPTION

Figure 1:
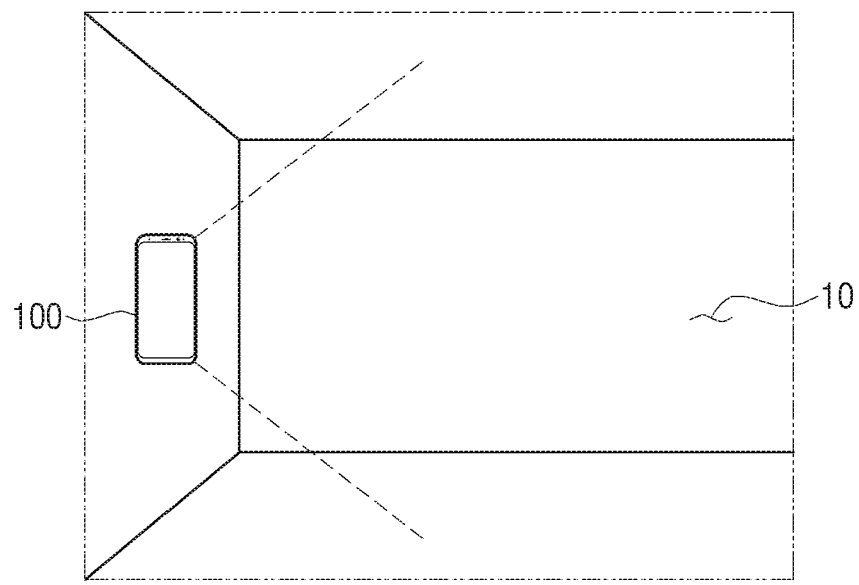
FIG. 1 is a diagram illustrating an electronic device according to an embodiment.

In the following description of the disclosure, a detailed description of known functions and configurations may be omitted when it may obscure the subject matter of the disclosure. In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

However, this disclosure is not intended to limit the embodiments described herein but includes various modifications, equivalents, and/or alternatives. In the context of the description of the drawings, like reference numerals may be used for similar components.

In addition, expressions "first", "second", or the like, used in the disclosure may indicate various components regardless of a sequence and/or importance of the components, will be used only in order to distinguish one component from the other components, and do not limit the corresponding components.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

Hereinafter, embodiments of the disclosure will be described with reference to the accompanying drawings.

FIG. 1 is a diagram illustrating an electronic device according to an embodiment.

As illustrated in FIG. 1, an electronic device 100 is a device capable of providing augmented reality (AR) and may be implemented as a smartphone.

The electronic device 100 may provide an image in which an object for AR is arranged in an image which is an image of a space of a real world captured by a user, so that the user may intuitively grasp a space occupied by the thing.

Specifically, the electronic device 100 may generate an image in which an object for AR is overlapped with an image obtained by capturing a space including a single color wall surface 10 and provide the image to a user in real time. The single color wall surface 10 may refer to a vertical plane having a single color in the form of not having a texture or a pattern.

The electronic device 100 may identify a single color wall surface area from an image frame obtained by a camera 130 capturing a space including the single color wall surface 10 using a mono lens, identify a distance between a wall surface corresponding to the wall surface area and the electronic device, and display an object for AR on the wall surface area in the image frame obtained by the camera 130 based on a size corresponding to a distance between the electronic device 100 and the wall surface corresponding to the wall surface area.

The object for AR may refer that an existent thing is rendered three-dimensionally. For example, the object may be implemented in the form of a three-dimensionally rendered image of an object that may be placed by being attached to a wall surface, such as a wall mount television (TV), a digital picture frame, a sound bar, or the like. However, the embodiment is merely exemplary, and may be variously modified without being limited thereto. For convenience, the object will be described as an image in which a wall mount TV is rendered.

Accordingly, even when the single color wall surface 10 is captured by using the mono lens, the electronic device 100 may provide a user with AR that enables comparison of the position, height, and size (e.g., 50 inches, 60 inches, 70 inches) of the wall mount TV to be disposed on the single color wall surface 10 easily and conveniently.

Referring to FIG. 1, the electronic device 100 is illustrated as a smartphone but this is merely exemplary. The electronic device 100 may be implemented as a device such as a tablet personal computer (PC), a speaker, a mobile phone, a phone, an electronic book reader, a desktop PC, a laptop PC, a workstation, a server, a personal digital assistant (PDA), a portable multimedia player (PMP), an MP3 player, a medical device, a camera, a television, a digital video disc (DVD) player, a refrigerator, an air conditioner, a cleaner, an oven, an electronic range, a washing machine, an air cleaner, a set-top box, a home automation control panel, a security control panel, or a media box (e.g., SAMSUNG Home-Sync™, APPLE TV™, or GOOGLE TV™), game console (e.g., Xbox™ PlayStation™), an electronic dictionary, an electronic key, a camcorder, an electronic frame, or a wearable device.

Herein below, an electronic device providing AR and a control method thereof will be described in detail with reference to the drawings.

Figure 2:
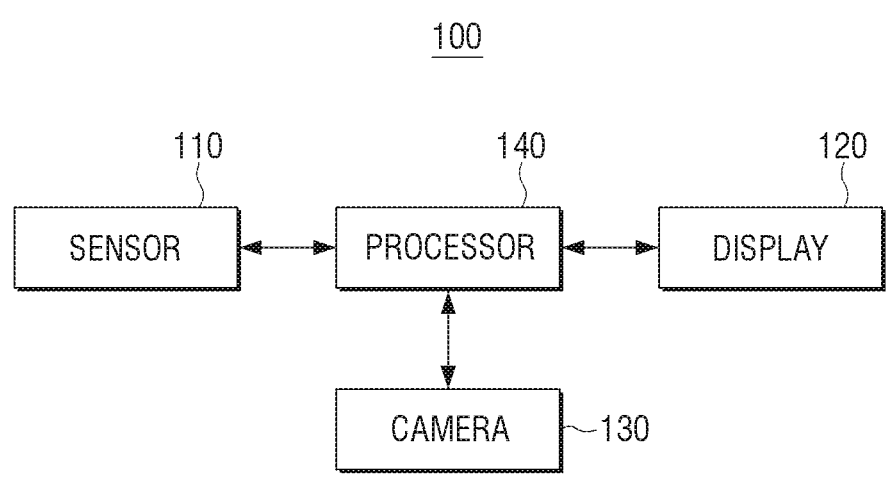
FIG. 2 is a block diagram of an electronic device according to an embodiment.

FIG. 2 is a block diagram of the electronic device 100 according to an embodiment.

Referring to FIG. 2, the electronic device 100 may include a sensor 110, a display 120, a camera 130, and a processor 140.

The sensor 110 may sense the angle, height, motion (moving and/or rotating speed, direction, distance, etc.) of the electronic device 100. The sensor 110 may include at least one of an acceleration sensor, a gyro sensor, a proximity sensor, a geomagnetic sensor, a gravity sensor, and a pressure sensor, and may include a motion sensor coupling the sensors, or the like.

The sensor 110 may detect light intensity (or brightness) for the surrounding environment and may include an optical sensor such as an illuminance sensor.

The sensor 110 may include a beam sensor such as a laser sensor, an infrared sensor, etc. In this case, the sensor 110 may directly sense a distance between the electronic device 100 and the surrounding space.

The display 120 may display image data processed by the image processor (not shown) on a display area (or display). The display area may refer to at least a portion of the display 120 exposed to one surface of the housing of the electronic device 100.

At least a portion of the display 120 may be coupled to at least one of a front area and a side area and a back area of the electronic device 100 in the form of a flexible display. The flexible display may be characterized as being bent, curved, or rolled without a damage through a paper-like thin and flexible substrate.

The display 120 may be implemented as a touch screen having a layer structure in combination with a touch panel (not shown). The touch screen may have a function of detecting a position of a touch input, an area of a touch input, and a pressure of a touch input as well as a display function, and may also have a function of detecting a touch close to the touch screen as well as a real-touch that is substantially in contact with the touch screen.

The camera 130 may capture a space using a mono lens to obtain an image frame for a space. At this time, the space may be a space including a wall surface. The image frame obtained by the camera 130 may then be processed in an image processor (not shown) and displayed on a display 120.

The processor 140 (or controller) may control overall operations of the electronic device 100.

The processor 140 may identify a boundary area between the wall surface area and an area other than the wall surface area from the image frame obtained by the camera 130.

The processor 140 may identify a mono wall surface area in the image frame obtained by the camera 130. The image frame may be obtained by the camera 130 using a mono lens, and the image frame may be a plurality of image frames obtained in real time by continuously capturing a space including a single color wall surface.

The processor 140 may identify a similar pixel having a color similarity equal to or greater than a predetermined threshold value with a reference pixel existing at a predetermined position, in each of a plurality of image frames obtained by the camera 130. The reference pixel may be set to a pixel located at a center of the image frame. Here, a predetermined position or a predetermined threshold value may be a value previously set or a value set by a user and may be changed by a user.

The processor 140 may compare a color value of the pixel located at the center with the color value of the remaining pixels other than the pixel located at the center, based on the color value (e.g., red (R), green (G), blue (B)) of the pixel located at the center of the image frame and may identify that the smaller the color value difference is, the higher the similarity is. The processor 140 may identify pixels having a similarity greater than or equal to a predetermined threshold value as similar pixels. The predetermined threshold value may be a value previously set or a value set by a user, and may be changed by a user.

The processor 140 may identify an area including a reference pixel and a similar pixel as a wall surface area when a difference in size of an area including a reference pixel and a similar pixel between a plurality of image frames is in a predetermined threshold range. Here, the predetermined threshold range may be a value previously set or set by a user and may be changed by a user.

The processor 140 may determine an area including a reference pixel and a similar pixel for each of the plurality of image frames, compare a difference in size (or position, etc.) of an area including a reference pixel and a similar pixel between the plurality of image frames, and determine an area including a reference pixel and a similar pixel as a wall surface area (i.e., when the size of the area remains constant within a predetermined threshold range in the plurality of image frames).

Even when color of a pixel may temporarily change according to brightness of light of surrounding environment, reflection of light, or the like, the processor 140 may more accurately detect the single color wall surface area.

The color value of the pixel may be distorted in the case of an image frame obtained in a dark environment (i.e., a low illumination environment) and thus, the processor 140 may perform an operation of detecting a single color wall surface area in the image frame only when the illuminance value sensed by the sensor 110 is greater than or equal to a predetermined value (e.g., 3 lx). The predetermined value may be a predetermined value or a value set by the user and may be changed by the user.

While the image frame may be directly obtained by the camera 130 using a mono lens included in the electronic device 100, this is only one embodiment, and the electronic device 100 may receive, from the external device, the image frame in which the external device using a mono lens is captured.

The processor 140 may identify a boundary area between a wall surface area and an area other than the wall surface area in an image frame. At this time, the area other than the wall surface area may have a specific texture or pattern distinguished from a wall surface area, or a mono color area.

Specifically, the processor 140 may identify a pattern area including a specific pattern in an area other than the wall surface area for each of the plurality of image frames. Here, the pattern may refer to a set of pixels forming a particular shape or a set of pixels that are repeated with a predetermined rule. For example, the pattern area may be a shadow area, a non-visible area, or the like.

The processor 140 may identify a pattern area including a specific pattern only for an adjacent area having a predetermined threshold range with a wall surface area among other areas. Accordingly, it is possible to improve the speed and accuracy of identifying the pattern area by reducing the operation range of the processor 140.

The processor 140 may identify the distance between the electronic device 100 and the wall surface corresponding to the wall surface area based on the identified boundary area and the position of the electronic device 100 identified by the sensor 110. The wall surface (reality space) may correspond to a wall surface area (virtual space) in the image frame.

The processor 140 may identify a distance between the electronic device 100 and a boundary corresponding to the boundary area based on the movement of the electronic device 100 identified by the sensor 110. The boundary (reality space) may correspond to a boundary area (virtual space) between the wall surface area and the area other than the wall surface area in the image frame.

The processor 140 may obtain a set of three-dimensional points in a pattern area based on the movement of the electronic device 100 identified by the sensor 100 in a plurality of image frames, respectively.

When the electronic device 100 rotates, the processor 140 may determine an angle at which the image frame is captured according to the rotation information of the electronic device 100 identified by the sensor 110. The processor 140 may then perform stereo synthesis on the two image frames continuously captured at different angles to obtain a depth image. The processor 140 may then obtain a set of three-dimensional points in the pattern area of the depth image in which stereo synthesis has bene performed.

The set of 3D points may have an attribute value such as position (or vector) information on X, Y, and Z axes, reflection intensity, or the like, and may be implemented as a point cloud, or the like.

The processor 140 may identify a boundary area according to a straight line corresponding to a set of 3D points. For example, the processor 140 may identify a straight line generated according to an algorithm that linearizes a set of 3D points as a boundary area.

The area other than the wall surface area may include a ceiling area existing on the upper side of the wall surface area and a floor area existing on the lower side of the wall surface area. The processor 140 may identify a first boundary area between the ceiling area and the wall surface area and a second boundary area between the floor area and the wall surface area in the image frame.

The processor 140 may provide the user with a message informing the user when the wall surface area, the ceiling area, and the floor area are not included in the captured image frame, and may provide the user with a guide that induces the user to capture by including all the wall surface area, the ceiling area, and the floor area. For example, the processor 140 may display a graphical user interface (GUI) including text, such as "please capture to include the ceiling and floor" through the display 120.

The processor 140 may identify a degree of changing the position of the wall surface area in a plurality of image frames obtained by the camera 130 while the electronic device 100 moves. It is assumed that the electronic device 100 rotates within a predetermined range of angles.

The processor 140 may obtain the angle of rotation of the electronic device 100 by the sensor 110, calculate the distance traveled by the boundary area obtained in the image frame, and identify the degree of change of the position of the wall surface area in the plurality of image frames obtained by the camera 130.

The processor 140 may identify the distance between the electronic device 100 and the boundary corresponding to the boundary area based on the degree of change of the position of the wall surface area and the degree of movement of the electronic device 100 obtained by the sensor 110.

The processor 140 may identify the distance between the electronic device 100 and the wall surface area based on the distance between the electronic device 100 and the boundary and the height of the electronic device 100 obtained by the sensor 110.

The processor 140 may identify the height of the electronic device 100 with respect to a floor surface based on the position of the electronic device 100 identified by the sensor 110, and may identify the distance between the electronic device 100 and the wall surface by using a trigonometric ratio in accordance with the distance between the electronic device 100 and the boundary corresponding to the second boundary area and the height of the electronic device 100.

The processor 140 may control the display 120 to display an object on a wall surface area in a size corresponding to the identified distance.

The processor 140 may identify a size corresponding to the identified distance based on a predetermined size of the object and a predetermined distance, and control the display 120 so that the object is displayed on the wall surface area with the identified size. Here, the predetermined size and the predetermined distance is a value previously set or set by a user and may be changed by the user.

For example, an object that is obtained by rendering a 100-inch TV (220 cm in width×120 cm in height) is displayed on an image frame at a predetermined size of 220×125 when a predetermined distance between the wall surface area and the electronic device 100 is 10 m. If the distance between the wall surface area and the electronic device 100 is 5 m, the processor 140 may display the object on a wall surface area in the image frame so that the object has a size of 440×250. If the distance between the wall surface area and the electronic device 100 is 15 m, the processor 140 may display the object on a wall surface area in the image frame so that the object has a size of 88×50. As described above, the size of the object matched with the distance between the wall surface area and the electronic device 100 and the predetermined size may be stored in the electronic device 100. Here, the predetermined size is a value previously set or set by a user and may be changed by a user.

Based on receiving a user command to select a position among the wall surface areas, the processor 140 may control the display 120 to display the object at a selected position.

FIGS. 3 to 6 are diagrams illustrating a control method of the electronic device 100 according to an embodiment.

Figure 3:
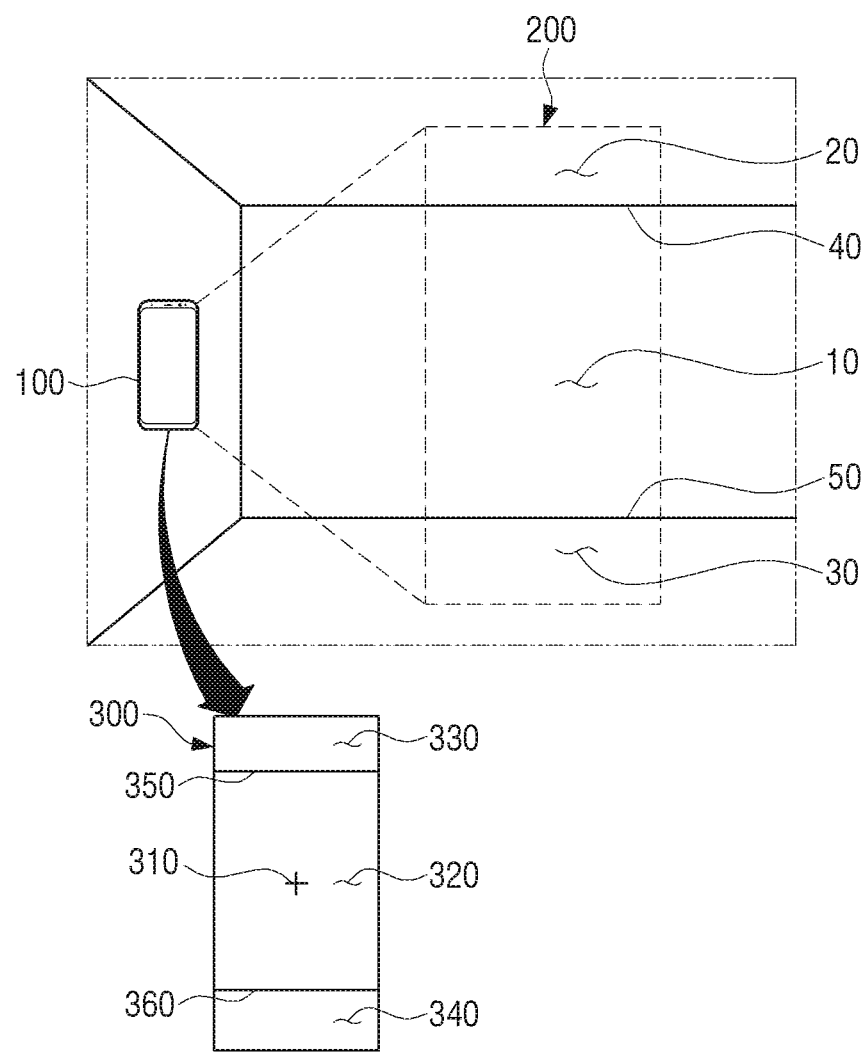
FIGS. 3, 4A, 4B, 5, 6A, and 6B are diagrams illustrating a control method of an electronic device according to an embodiment.

Referring to FIG. 3, the processor 140 may identify a single color wall surface area in an image frame obtained by the camera 130 performing capturing using a mono lens.

The processor 140 may obtain an image frame 300 for a space 200 captured by the camera 130 using a mono lens.

The space 200 may include the wall surface 10, a ceiling surface 20, a floor surface 30, the boundary 40 between the wall surface 10 and the ceiling surface 20, and a boundary 50 between the wall surface 10 and the floor surface 30.

The image frame 300 may include a reference pixel 310, a wall surface area 320 corresponding to the wall surface 10, the ceiling surface area 330 corresponding to the ceiling surface 20, the floor area 340 corresponding to the floor surface 30, the wall surface area 320 corresponding to the boundary area 40 of the wall surface 10 and the ceiling surface 20, the first boundary area 350 between the wall surface area 320 and the ceiling area 330, the wall surface area 320 corresponding to the boundary area 50 of the wall surface 10 and the floor surface 30, and a second boundary area 360 between the wall surface area 320 and the floor surface 340.

The processor 140 may identify the single color wall surface area 320 in the image frame 300 obtained by the camera 130. The image frame 300 may be a plurality of image frames obtained in real time by continuously capturing the space 200.

The processor 140 may determine, in each of the plurality of image frames obtained by the camera 130, the area including the reference pixel 310 and the similar pixel having a color similarity greater than or equal to a predetermined threshold value with the reference pixel 310. The reference pixel 310 may be set to a pixel located at the center of the image frame 300.

The processor 140 may compare the difference in size of areas including the reference pixel 310 and the similar pixel among the plurality of image frames to identify the area including the reference pixel 310 and the similar pixel as the wall surface area 320 when the difference in size is within a predetermined threshold range.

The processor 140 may identify the boundary area between the wall surface area and the area other than the wall surface area, from the image frame, and may identify the distance between the boundary corresponding to the boundary area and the electronic device 100 based on the movement of the electronic device 100 obtained by the sensor 110.

Figures 4A, 4B:
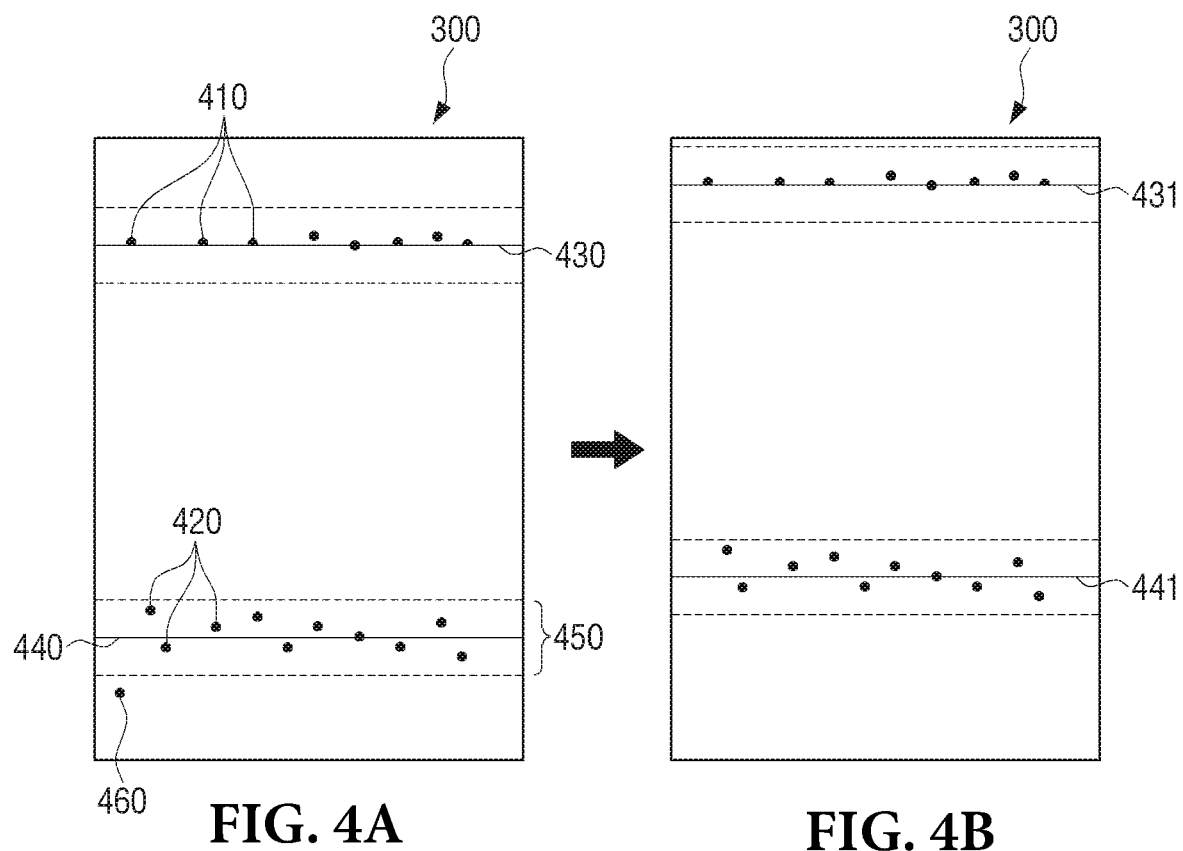

Referring to FIG. 4A, the processor 140 may identify the area other than the wall surface area based on the wall surface area in the image frame 300 and may identify the boundary area between the wall surface area and an area other than the wall surface area.

The processor 140 may identify a pattern area including a particular pattern in an area other than a wall surface area, and may obtain a set of three-dimensional points 410 and 420 in the pattern area based on the movement of the electronic device 100 obtained by the sensor 110 in each of the plurality of image frames.

The processor 140 may identify a pattern area including a specific pattern only for an area having a predetermined threshold range among areas other than the wall surface area. For example, the processor 140 may not identify the pattern area for an area beyond a predetermined threshold range 450 even if a pattern 460 is present in the area beyond the predetermined threshold range 450. The processor 140 may improve the speed and accuracy of identifying the pattern area.

The processor 140 may identify the straight lines 430, 440 corresponding to the set 410, 420 of the 3D points as the boundary area.

Referring to FIGS. 4A and 4B, the processor 140 may identify the distance between the boundary corresponding to the boundary area and the electronic device 100 based on the movement of the electronic device 100 obtained by the sensor 110.

For example, when the camera 130 of the electronic device 100 is rotated toward the floor surface of the electronic device 100 as shown in FIG. 4B, while the camera 130 of the electronic device 100 faces the wall surface as illustrated in FIG. 4A, the electronic device 100 may obtain the degree of movement (e.g., rotation angle, etc.) of the electronic device 100 by the sensor 110.

The electronic device 100 may compare the center position of the first boundary area 430, 431 in the plurality of image frames with the center position of the second boundary area 440, 441 to identify the degree of change of the position of the wall surface area according to the degree of change in the center position of the first boundary area 430, 431 and the center position of the second boundary area 440, 441.

The electronic device 100 may identify the distance between the boundary corresponding to the boundary area and the electronic device 100 based on the degree of movement of the electronic device 100 obtained by the sensor 110 and the degree of changing the position of the wall surface area.

The electronic device 100 may pre-store information about the distance between the boundary corresponding to the boundary area and the electronic device 100 matched to the angle at which the electronic device 100 is rotated and the distance during which the boundary area is moved.

The processor 140 may identify the distance between the electronic device 100 and the boundary by obtaining information matched with the distance to which the boundary area is moved in the image frame and the angle at which the electronic device 100 is rotated obtained by the sensor 110, among the prestored information about the distance.

For example, the electronic device 100 may store that the distance between the electronic device 100 and the boundary is 5 m, when the angle at which the electronic device 100 is rotated is 10 degrees and the distance to which the boundary area is moved is 10.

The processor 140 may identify that the distance between the electronic device 100 and the boundary is 5 m, depending on the rotated angle and the distance to which the boundary area is moved, if the rotated angle is 10 degrees, and the distance to which the boundary area is moved is 10.

Figure 5:
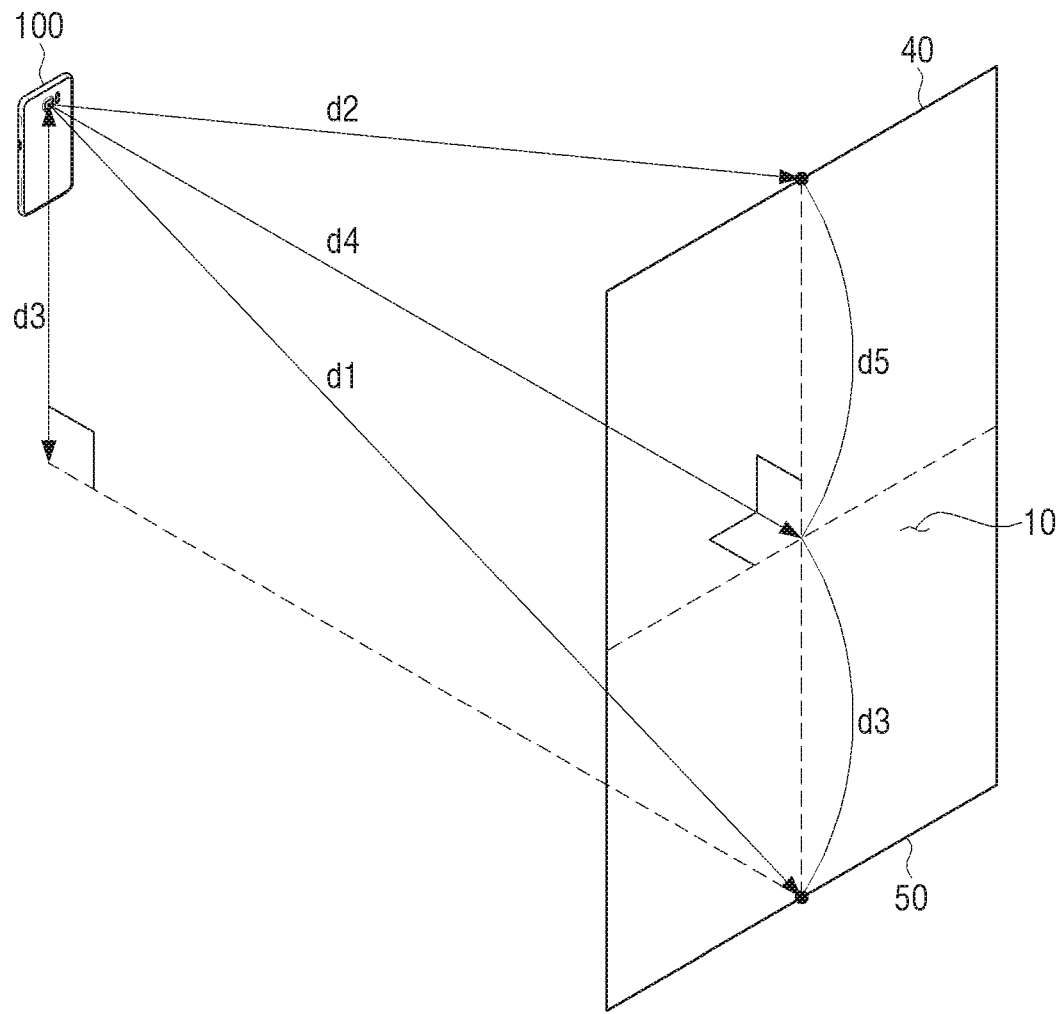

Referring to FIG. 5, the processor 140 may identify the distance between the electronic device 100 and the wall surface 10 based on the distance between the electronic device 100 and the boundary and the height of the electronic device 100 identified by the sensor 110.

The processor 140 may identify distance d4 between the electronic device 100 and the wall surface 10 using Equation 1 below.

$$d4 = \sqrt{d1^2 - d3^2} \quad \text{[Equation 1]}$$

The distance between the electronic device 100 and the second boundary 50 is d1, and the distance between the electronic device 100 and the floor surface is d3.

The distance d5 between the electronic device 100 and the ceiling may be Equation 2 below.

$$d5 = \sqrt{d2^2 - d4^2} \quad \text{[Equation 2]}$$

The distance between the electronic device 100 and the first boundary 40 is d2.

The processor 140 may identify the distance between the electronic device 100 and the wall surface 10 and the height of the wall surface 10 (i.e., the distance between the floor and the ceiling) in the image frame captured by the mono lens in real time.

Figures 6A, 6B:
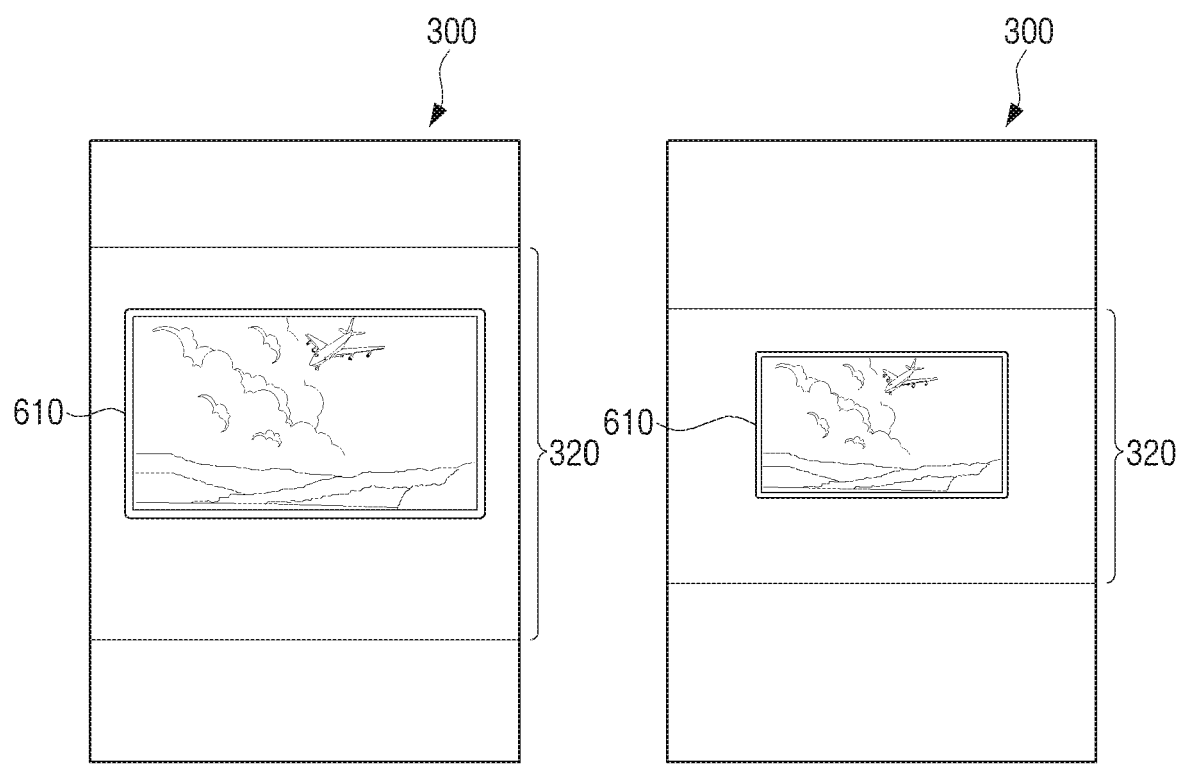

Referring to FIGS. 6A and 6B, the processor 140 may control the display 120 such that an object 610 for AR is displayed on the wall surface area 320 in a size corresponding to a distance between the wall surface and the electronic device 100.

The processor 140 may identify a size corresponding to a distance between the wall surface and the electronic device 100 based on a predetermined size of the object 610 and a predetermined distance. The processor 140 may control the display 120 such that the object 610 is displayed on the wall surface area 320 in the identified size.

Information on the size of the object 610 that matches the distance between the electronic device 100 and the wall surface area 320 and the predetermined size of the object 610 to be displayed on the wall surface area 320 may be pre-stored in the electronic device 100.

The processor 140 may obtain information on a size that matches the distance between the wall surface area 320 and the electronic device 100 and a predetermined size of the object 610 to identify the size of the object 610 to be displayed on the wall surface area 320.

For example, the object 610, which is an image in which a 100-inch TV (a width 220 cm×length 125 cm) is rendered, may be displayed on the image frame 300 in a predetermined size of 220×125, when the distance between the electronic device 100 and the wall surface area 320 is 10 m.

As shown in FIG. 6A, if the distance between the electronic device 100 and the wall surface area 320 is 5 m, the processor 140 may obtain a size of 440×250, which matches the distance between the electronic device 100 and the wall surface area 320 and the predetermined size of the object 610, so that the object 610 is displayed on the wall surface area 320 of the image frame 300 in a size of 440×250.

As shown in FIG. 6B, if the distance between the electronic device 100 and the wall surface area 320 is 15 m, the processor 140 may obtain a size of 88×50 that matches the distance between the electronic device 100 and the wall surface area 320 and the predetermined size of the object 610, so that the object 610 is displayed on the wall surface area 320 of the image frame 300 in a size of 88×50.

The processor 140 may identify the size of the object 610 according to the height of the wall surface 10 and the height of the wall surface area 320 (or the distance between the first boundary and the second boundary).

According to an embodiment, the electronic device 100 may identify a distance between the electronic device 100 and the wall surface 10, the height of the electronic device 100, and the height of the wall surface 10, or the like, in an image frame captured by a mono lens, in real time, and accordingly, the electronic device 100 may provide an image in which an object for AR is synthesized on a single color wall in real time.

Figure 7A:
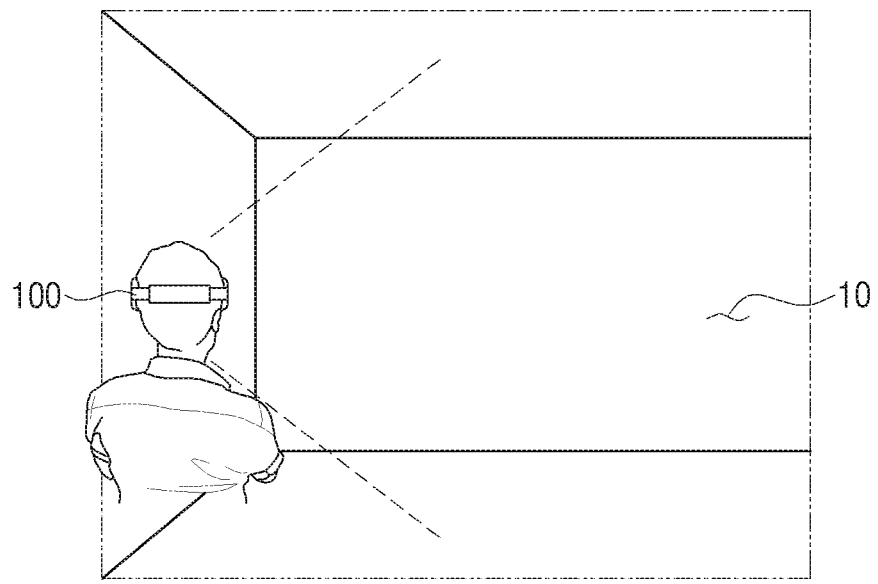
FIGS. 7A and 7B are diagrams illustrating an electronic device according to another embodiment.
Figure 7B:
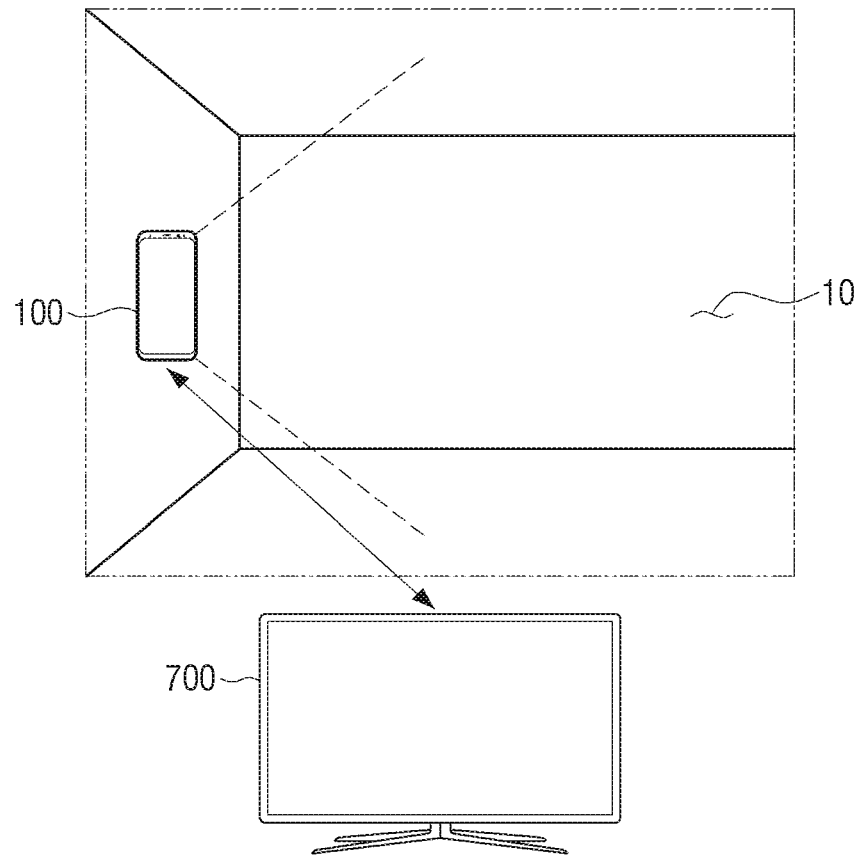

FIGS. 7A and 7B are diagrams illustrating the electronic device 100 according to another embodiment.

As described above, the electronic device 100 may be implemented with various types of devices.

For example, as illustrated in FIG. 7A, the electronic device 100 may be implemented as a wearable device which a user may wear. The wearable device may be implemented as various types of devices such as an accessory type (e.g., a watch, a ring, a bracelet, a wrinkle bracelet, a necklace, a pair of glasses, a contact lens or a head-mounted-device (HMD), or the like), a fabric or a garment-embedded type (e.g., an electronic clothing, or the like), skin-attached type, or a bio-implantable circuit.

In the example described above, the electronic device 100 may identify the distance between the electronic device 100 and the wall surface, and display an image in which the object for AR is synthesized is displayed on the display 120, but this is merely exemplary, and as shown in FIG. 7B, at least a portion of the function performed by the electronic device 100 may be performed by an external electronic device 700, that is, through a system including the electronic device 100 and at least one external electronic device. The external electronic device 700 is illustrated as a TV in FIG. 7(*b*), but the embodiment is not limited thereto and may be implemented as various electronic devices such as a server, and the like.

The electronic device 100 may transmit information on the position (or height) of the electronic device 100 identified by the sensor 110 and the image capturing the wall surface to an external electronic device 700.

The external electronic device 700 may identify the distance between the wall surface and the electronic device 100 by using the information received from the electronic device 100 (the image capturing the wall surface and information on the position (or height) of the electronic device 100).

As an example, the external electronic device 700 may determine the size of an object corresponding to the identified distance, and display an image in which the object is synthesized with the wall surface area through the display of the external electronic device 700.

In another embodiment, the external electronic device 700 may transmit information about the identified distance between the wall surface and the electronic device 100 to the electronic device 100. In this example, the electronic device 100 may display an object on a wall surface area of an image through a display of the electronic device 100 in a size corresponding to information on a distance between the electronic device 100 and a wall surface received from the external electronic device 700.

In another embodiment, the external electronic device 700 may identify the distance between the wall surface and the electronic device 100 using the information received from the electronic device 100, determine the size of the object according to the distance, generate an image in which the object for AR is synthesized, and transmit the generated image to the electronic device 100. As described above, the external electronic device 700 may perform an operation such as identifying a distance by using information received from the electronic device 100, and transmit the obtained data as a result of performing the operation to the electronic device 100. The electronic device 100 may display the image received from the external electronic device 700 through the display of the electronic device 100.

In these cases, the electronic device 100 and the external electronic device 700 may perform communication using various types of data communication schemes (e.g., Wi-Fi, Bluetooth, LAN, etc.) and/or various types of voice and/or video signal communication schemes (e.g., DVI, HDMI, Thunderbolt, etc.).

According to various embodiments, the electronic device 100 may identify a distance between the electronic device 100 and the wall surface as a result of performing speech recognition, and may display an image in which the object is synthesized with the wall surface area via the display 120. Hereinafter, an operation of performing speech recognition with the exception of duplicate contents will be described.

The processor 140 of the electronic device 100 may obtain a voice signal by converting a user voice, which is an analog signal, into a digital signal by an external microphone (not shown) connected by wire through an input/output port (not shown) of the electronic device 100 or a microphone (not shown) provided inside the electronic device 100.

The embodiment is merely exemplary and the processor 140 of the electronic device 100 may obtain a voice signal from an external electronic device (not shown).

The electronic device 100 and the external electronic device may include a communicator (not shown), respectively, and may transmit and receive data through the communicator. The communicator may include at least one of a Wi-Fi (Wi-Fi or Wi-Fi Direct) communication module, a Bluetooth module, an infrared data association (IrDA) module, a near field communication (NFC) module, or a communication module, and respective models may be implemented separately or each module may be integrated.

The external electronic device may convert a user's voice, which is an analog signal, into a digital signal by a microphone provided inside the external electronic device or an external microphone, to obtain a voice signal, and may transmit the voice signal obtained through the communicator to the electronic device 100. Here, the external electronic device may be implemented as a smart phone, a remote controller, or the like.

For example, when an external electronic device is implemented as a smartphone, the external electronic device may be installed or stored with an application capable of controlling the electronic device 100, and may be implemented to control the electronic device 100 such as a TV or a set-top box through an application. Furthermore, the external electronic device may perform voice recognition directly on the obtained voice signal or transmit the result of performing speech recognition through the server to the electronic device 100.

As another example, when an external electronic device is implemented as a remote controller, the external electronic device may include an inputter (e.g., a button, a joystick, etc.) capable of controlling the electronic device 100, and may be implemented to control the electronic device 100 such as a TV or a set-top box through manipulation of the inputter.

The processor 140 of the electronic device 100 may perform voice recognition in the obtained voice signal and control the electronic device 100 to perform an operation corresponding to the result of performing the voice recognition.

The processor 140 of the electronic device 100 may transmit the obtained voice signal to a voice recognition server (not shown).

When the user voice is received, the voice recognition server may convert the received user voice into text by using the speech to text (STT) algorithm. The voice recognition server may obtain response information that enables to perform an operation requested by a user based on the converted text. The speech recognition server may be implemented as a main server that performs a function of obtaining the STT function and response information.

The voice recognition server may transmit response information to the electronic device 100 to allow the electronic device 100 to perform the operation requested by the user.

The voice recognition server may be implemented as a system including a first server for performing an STT function and a second server for performing a function of obtaining response information. The first server may convert the received user voice into text and transmit the text to the second server, and the second server may obtain response information based on the received text and transmit the response information to the electronic device 100. The first server may transmit the converted text to the electronic device 100 and the electronic device 100 may obtain the response information based on the received text.

The processor 140 of the electronic device 100 may control the electronic device 100 to perform the operation requested by the user according to the response information.

According to another embodiment, the processor 140 of the electronic device 100 may perform the STT function to convert the text, and obtain response information according to the converted text, and the electronic device 100 may perform voice recognition directly.

Figure 8:
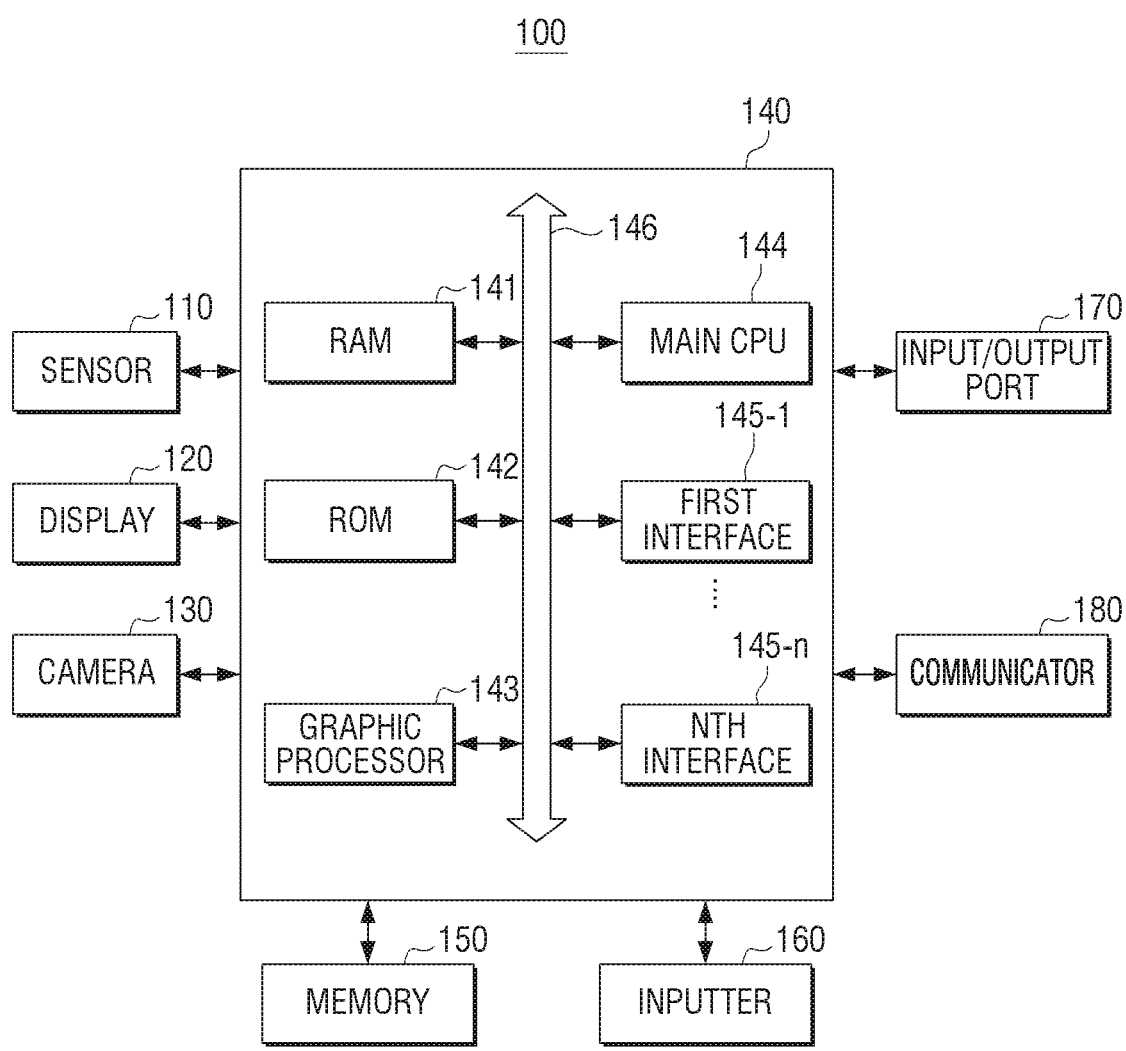
FIG. 8 is a block diagram illustrating a configuration of an electronic device in greater detail according to an embodiment.

FIG. 8 is a block diagram illustrating a configuration of the electronic device 100 in greater detail according to an embodiment.

Referring to FIG. 8, the electronic device 100 may include at least one of the sensor 110, the display 120, the camera 130, the processor 140, and an inputter 150, a speaker 160, and a communicator 170.

The processor 140 may include a random access memory (RAM) 141, a read-only memory (ROM) 142, a graphics processor 143, a main central processing unit (CPU) 144, a first to $n^{th}$ interfaces 145-1~145-n, and a bus 156. The RAM 141, the ROM 142, the graphics processor 143, the main CPU 144, the first to $n^{th}$ interfaces 145-1 to 145-n, or the like, may be interconnected through the bus 146.

The memory 150 may store various programs and data necessary for operating the electronic device 100.

The memory 150 may be implemented as a non-volatile memory, a volatile memory, a flash memory, a hard disk drive (HDD), a solid state drive (SSD), or the like. The memory 150 is accessed by the processor 140 and reading, writing, modifying, deleting, or updating of data by the processor 140 may be performed. In the disclosure, the term memory may include the memory 150, read-only memory (ROM) in the processor 140, random access memory (RAM), or a memory card (for example, a micro secure digital (SD) card, and a memory stick) mounted to the electronic device 100.

The inputter 160 may receive various user inputs and pass the same to the processor 140. The inputter 160 may include, for example, at least one of a touch panel, a (digital) pen sensor, or a key. The touch panel may be used in relation to, for example, at least one of an electrostatic, a pressure-sensitive, infrared, or ultrasonic manner, and the touch panel may include a control circuit. The touch panel may further include a tactile layer to provide a tactile response to the user. The (digital) pen sensor may, for example, be part of a touch panel or include a separate recognition sheet. The key may include, for example, a physical button, an optical key, or a keypad. The inputter 160 may be connected with an external device (not shown) such as a keyboard, a mouse, or the like, by wire or wirelessly and may receive a user input.

The I/O port 170 is configured to connect the electronic device 100 and an external device by wire so that the electronic device 100 may transmit or receive signals associated with an image and/or voice with an external device (not shown). The I/O port 170 may include a module for processing a transmitted or received signal.

For this purpose, the I/O port 170 may be implemented with a wired port such as a high definition multimedia interface (HDMI) port, a display port, an RGB port, a digital visual interface (DVI) port, a Thunderbolt bolt, and a component port.

In one example, the electronic device 100 may receive a signal associated with an image and/or voice from an external device (not shown) via the I/O port 170, such that the electronic device 100 may output an image and/or voice. As another example, the electronic device 100 may transmit a signal associated with a specific image and/or voice to the external device through the I/O port 170 so that an external device may output an image and/or voice.

As such, signals associated with an image and/or voice may be transmitted in one direction through the input/output port 170. However, this is merely exemplary, and the signal associated with an image and/or voice may be transmitted bi-directionally through the input/output port 170 in one or more other embodiments.

The input/output port 170 may include an USB port (2.0, USB 3.0, USB C, or the like), a secure digital (SD) card port, a micro SD card port, or the like.

The electronic device 100 may include a microphone (not shown) and a speaker (not shown). The microphone (not shown) may directly obtain the signal for the voice from the external sound. The speaker (not shown) may directly output various notification sound or voice messages as well as various audio data for which various processing has been performed, such as decoding or amplification, noise filtering, etc., by an audio processor (not shown).

The communicator 180 may communicate with various types of external devices according to various types of communication methods. The communicator 180 may include at least one of a Bluetooth chip (not shown), a Wi-Fi chip (not shown), a wireless communication chip (not shown), and a near field communication (NFC) chip (not shown).

The communicator 180 may be controlled by the processor 140 to communicate with various external devices (not shown), such as other electronic devices, servers, or the like.

When performing data communication with an external device (not shown) in a wireless communication method, the communicator 180 may include at least one of a WiFi direct communication module, a Bluetooth module, an infrared data association (IrDA) module, a near field communication (NFC) module, a Zigbee module, a cellular communication module, a 3rd generation (3G) mobile communication module, a fourth generation (4D) mobile communication module, a fourth Long Term Evolution (LTE) communication module, or a 5th generation (5G) mobile communication module.

The communicator 180 may transmit and receive data with an external device (not shown) through an input/output port in a wired manner, and the communicator 180 may include a wired LAN module, Ethernet module, or the like.

Figure 9:
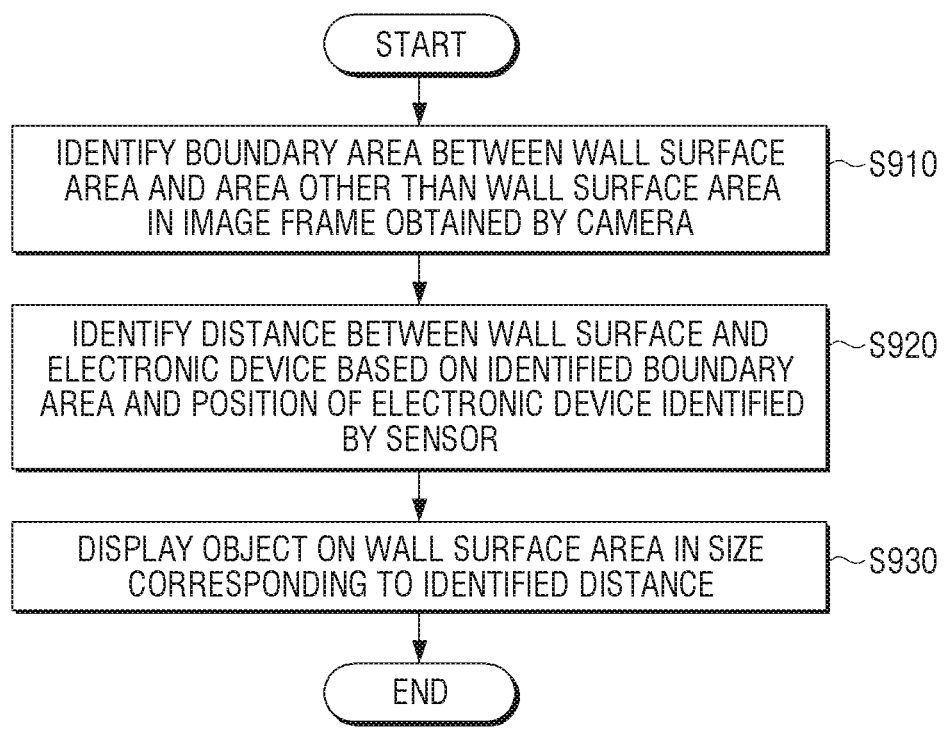
FIG. 9 is a flowchart illustrating a control method of an electronic device according to an embodiment.

FIG. 9 is a flowchart illustrating a control method of the electronic device 100 according to an embodiment.

Referring to FIG. 9, the boundary area between the wall surface area and the area other than the wall surface area may be identified in the image frame obtained by the camera 130 in operation S910. The camera may perform capturing on a single color wall using a mono lens, and obtain an image frame including a wall surface area corresponding to a single color wall as a capturing result.

The method may include identifying a similar pixel having a color similarity with a reference pixel present in a preset position by a threshold value or more, from a plurality of image frames obtained by the camera, respectively, and based on a difference of sizes of areas including the reference pixel and the similar pixel being within a preset threshold range among the plurality of image frames, identifying the area including the reference pixel and the similar pixel as the wall surface area.

The method may include identifying a pattern area including a specific pattern from an area other than the wall surface area, obtaining a set of three-dimensional (3D) points from the pattern area based on a movement of the electronic device identified by the sensor, and identifying the boundary area according to a straight line corresponding to the set of 3D points.

The area other than the wall surface area may include a ceiling area present in an upper side of the wall surface area and a floor area present in a lower side of the wall surface area from the image frame, and, the method may include identifying a first boundary area between the ceiling area and the wall surface area and a second boundary area between the floor area and the wall surface area from the image frame.

The distance between the wall surface and the electronic device 100 may be identified based on the identified boundary area and the position of the electronic device identified by the sensor 110 in operation S920.

The electronic device 100 may identify a change in position of the electronic device by the sensor 110 during the movement of the electronic device 100 and a change in the position of the wall surface area in a plurality of image frames obtained by the camera 130, and may identify the distance between the electronic device 100 and the boundary corresponding to the boundary area according to the degree of change of the position of the wall surface area and the degree of change of the position of the electronic device 100 identified by the sensor 110.

Based on the distance between the electronic device 100 and the boundary corresponding to the boundary area and the position of the electronic device 100 identified by the sensor 110, the distance between the wall surface area corresponding to the wall surface area and the electronic device 100 may be identified.

The height of the electronic device 100 based on the floor surface may be identified based on the position of the electronic device 100 identified by the sensor 110, and the distance between the electronic device 100 and the wall surface area may be identified based on the distance between the electronic device 100 and the boundary corresponding to the second boundary area and the height of the electronic device 100.

The object may be displayed on the wall surface area in a size corresponding to the identified distance in operation S930.

A size of an object having a predetermined size to be displayed on a wall surface area may be identified based on a distance between the wall surface area and the electronic device 100, and the object may be displayed in the identified size on the wall surface area.

Based on receiving the input to select the wall surface area, the object may be displayed on the selected position among the wall surface area.

According to various embodiments as described above, an electronic device capable of providing an image in which a virtual object is generated on a monochrome wall surface of an image captured by a mono lens and a control method thereof are provided.

The distance measurement accuracy by the mono lens may be improved, and a product may be small-scaled and simplified compared to a dual lens, and costs may be reduced.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Various embodiments may be implemented as software that includes instructions stored in machine-readable storage media readable by a machine (e.g., a computer). A device may call instructions from a storage medium and operate in accordance with the called instructions, including an electronic apparatus (e.g., the electronic device 100). When the instruction is executed by a processor, the processor may perform the function corresponding to the instruction, either directly or under the control of the processor, using other components. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

According to embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PLAYSTORE™). In the case of on-line distribution, at least a portion of the computer program product may be stored temporarily in a storage medium, such as a manufacturer's server, a server in an application store, a memory in a relay server, and the like, or temporarily generated.

Each of the components (for example, a module or a program) according to embodiments may include one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations may be added.

What is claimed is:

1. An electronic device comprising:
 a sensor;
 a display;
 a camera; and
 a processor configured to:
  identify a boundary area between a wall surface area and an area other than the wall surface area from an image frame obtained by the camera,
  identify a distance between a wall surface corresponding to the wall surface area and the electronic device based on a position of the electronic device identified by the sensor and the identified boundary area, and
  control the display so that an object is displayed on the wall surface area in a size corresponding to the identified distance,
 wherein the area other than the wall surface area comprises a ceiling area present in an upper side of the wall surface area and a floor area present in a lower side of the wall surface area from the image frame, and
 wherein the processor is further configured to:
  identify a first boundary area between the ceiling area and the wall surface area, and a second boundary area between the floor area and the wall surface area from the image frame,
  identify a height of the electronic device with respect to a floor surface by the sensor, and
  based on a distance between a second boundary corresponding to the second boundary area and the electronic device, and the height of the electronic device, identify the distance between the wall surface corresponding to the wall surface area and the electronic device.

2. The electronic device of claim 1, wherein the processor is further configured to:
identify a similar pixel having a color similarity with a reference pixel present in a preset position by a threshold value or more, from a plurality of image frames obtained by the camera, respectively, and
based on a difference of sizes of areas including the reference pixel and the similar pixel being within a preset threshold range among the plurality of image frames, identify an area including the reference pixel and the similar pixel as the wall surface area.

3. The electronic device of claim 1, wherein the processor is further configured to:
identify a pattern area including a specific pattern from the area other than the wall surface area,
obtain a set of three-dimensional (3D) points from the pattern area based on a movement of the electronic device identified by the sensor, and
identify the boundary area according to a straight line corresponding to the set of 3D points.

4. The electronic device of claim 1, wherein the processor is further configured to:
identify a degree of changing a position of the wall surface area from the plurality of image frames obtained by the camera while the electronic device moves, and
identify a distance between a boundary corresponding to the boundary area and the electronic device based on the degree of changing the position of the wall surface area and a degree of movement of the electronic device identified by the sensor.

5. The electronic device of claim 1, wherein the processor is further configured to:
identify a size corresponding to the identified distance based on a preset size of the object and a preset distance, and
control the display to display the object in the wall surface area in the identified size.

6. The electronic device of claim 1, wherein the processor is further configured to, based on receiving a user command to select a position among the wall surface area, control the display to display the object on the selected position.

7. A control method of an electronic device comprising:
identifying a boundary area between a wall surface area and an area other than the wall surface area from an image frame obtained by the camera;
identifying a distance between a wall surface corresponding to the wall surface area and the electronic device based on a position of the electronic device identified by the sensor and the identified boundary area; and
displaying an object on the wall surface area in a size corresponding to the identified distance, and
wherein the area other than the wall surface area comprises a ceiling area present in an upper side of the wall surface area and a floor area present in a lower side of the wall surface area from the image frame, and
wherein the identifying the boundary area comprises identifying a first boundary area between the ceiling area and the wall surface area, and a second boundary area between the floor area and the wall surface area from the image frame, and
wherein the identifying the distance between the wall surface and the electronic device comprises identifying a height of the electronic device with respect to a floor surface by the sensor, and based on a distance between a second boundary corresponding to the second boundary area and the electronic device, and the height of the electronic device, identifying the distance between the wall surface corresponding to the wall surface area and the electronic device.

8. The method of claim 7, wherein the identifying the boundary area further comprises:
identifying a similar pixel having a color similarity with a reference pixel present in a preset position by a threshold value or more, from a plurality of image frames obtained by the camera, respectively, and
based on a difference of sizes of areas including the reference pixel and the similar pixel being within a preset threshold range among the plurality of image frames, identifying an area including the reference pixel and the similar pixel as the wall surface area.

9. The method of claim 7, wherein the identifying the boundary area comprises:
identifying a pattern area including a specific pattern from the area other than the wall surface area,
obtaining a set of three-dimensional (3D) points from the pattern area based on a movement of the electronic device identified by the sensor, and
identifying the boundary area according to a straight line corresponding to the set of 3D points.

10. The method of claim 7, wherein the identifying the distance between the wall surface and the electronic device further comprises:
identifying a degree of changing a position of the wall surface area from the plurality of image frames obtained by the camera while the electronic device moves, and
identifying a distance between a boundary corresponding to the boundary area and the electronic device based on the degree of changing the position of the wall surface area and a degree of movement of the electronic device identified by the sensor.

* * * * *